United States Patent [19]

Casella

[11] 4,006,586

[45] Feb. 8, 1977

[54] CLOCK HOUSING AND DECORATIVE MEANS THEREFOR

[76] Inventor: Frank P. Casella, 2404 Freemansburg Ave., Easton, Pa. 18042

[22] Filed: Mar. 18, 1975

[21] Appl. No.: 559,489

Related U.S. Application Data

[62] Division of Ser. No. 442,324, Feb. 14, 1974, Pat. No. 3,889,806.

[52] U.S. Cl. .................................. 58/53; 29/179; 206/18; 206/301; 206/577

[51] Int. Cl.² .................. G04B 37/00; B23P 13/00; B65D 85/10; B65D 69/00

[58] Field of Search ............................ 29/177–179; 58/52–55, 88 R, 88 E, 88 G, 127; 206/223, 301, 18, 70; 229/32 R

[56] References Cited

UNITED STATES PATENTS

| | | | |
|---|---|---|---|
| 1,705,748 | 3/1929 | Bridgeman | 229/32 |
| 2,087,698 | 7/1937 | Mooney | 58/53 X |
| 2,574,998 | 11/1951 | Bangert, Jr. | 229/32 X |
| 2,640,668 | 6/1953 | Schmidt | 58/56 X |
| 3,284,272 | 11/1966 | Swislow | 58/53 X |
| 3,327,921 | 6/1967 | Baughan | 229/32 X |
| 3,447,672 | 6/1969 | Bailey et al. | 229/32 X |
| 3,572,577 | 3/1971 | Dorfman | 229/32 |
| 3,593,517 | 7/1971 | Knippler | 58/50 R |
| 3,786,627 | 1/1974 | Takagi | 58/127 R |

*Primary Examiner*—E. S. Jackmon
*Attorney, Agent, or Firm*—Alexander D. Ricci

[57] ABSTRACT

The invention provides a clock kit comprising a clock housing, decorative means adapted to project from the housing, a clock motor support means, a motor housing, hour indicators, hour and minute hands and a felt covering, and optionally a soft pad having the shape of the clock. The clock housing blank comprising a base, a plurality of circumferential tabs extending from the base, the tabs when taken together substantially extending about the circumference of the base, said tabs being folded out of the plane of said base to be perpendicular to said base with the extension of one tab being positioned against the adjacent tab and adhesively held in such position. The tabs are of such design and structure as to permit decorative means to be attached thereto and to project outward thereof.

2 Claims, 9 Drawing Figures

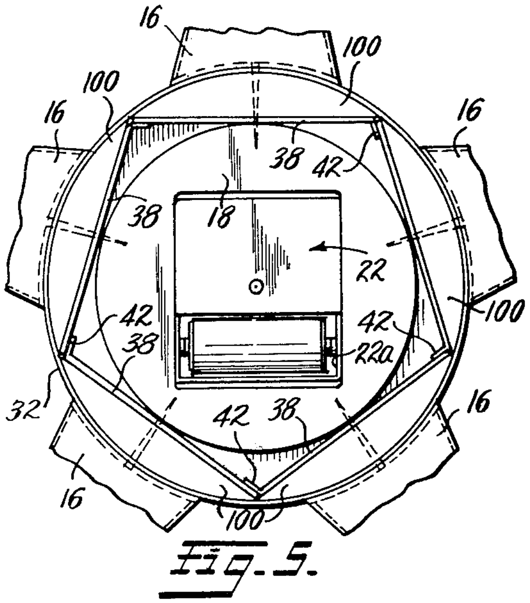
Fig. 5.
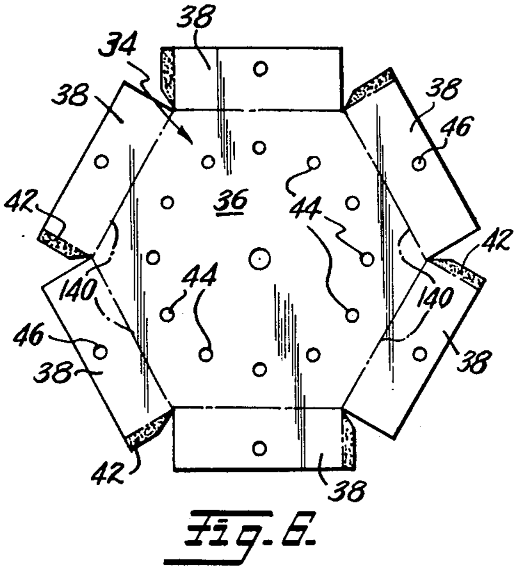
Fig. 6.
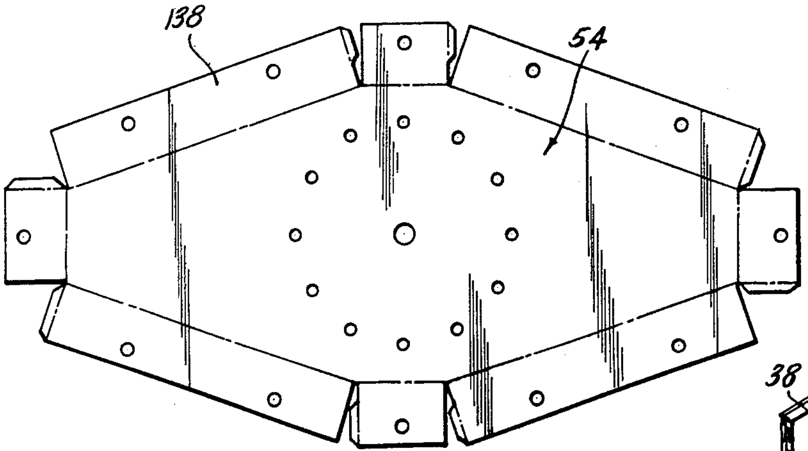
Fig. 7.
Fig. 9.
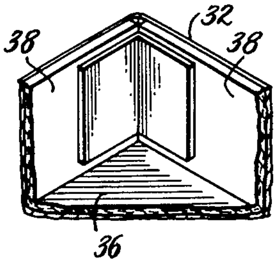
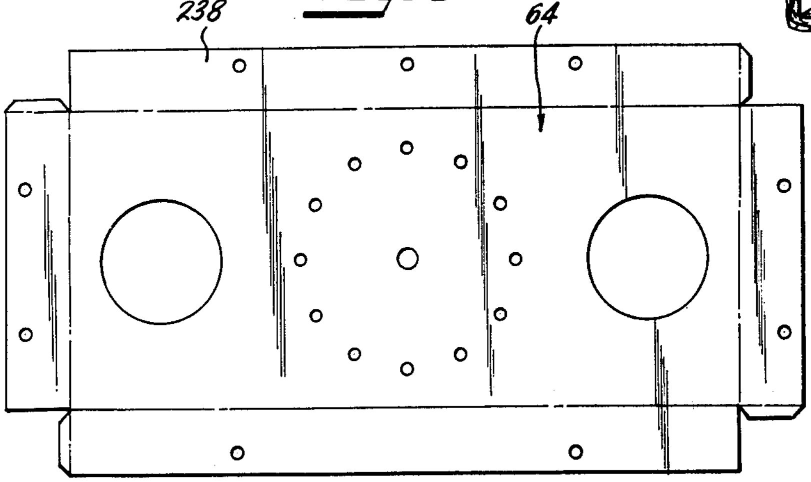
Fig. 8.

CLOCK HOUSING AND DECORATIVE MEANS THEREFOR

This is a division, of application Serial No. 442,324 filed Feb. 14, 1974 which is now U.S. Pat. No. 3,889,806.

BACKGROUND OF THE INVENTION

This invention relates to a clock kit, and in particular to a novel device that can be used to construct a clock of a most attractive nature in a variety of designs. The device is constructed in such a manner as to require relatively simple manipulations to thereby provide the foundation or base for a decorative clock or for that matter a frame. Because of the relative ease of producing the novel device, the device can be designed so as to provide a base structure which permits the clocks to be produced possessing respectively many different designs. Clocks for the most part are not specifically designed but rather fall into rather conventional designs. In some instances these rather conventional forms and designs may not suit people with desires to have special interior effects or a more decorative aspect to a necessary and practical appliance.

With this aspect in mind, it was the present inventor's objective to design and provide a means which would be of such versatility as to permit the individual to choose a decorative clock design to satisfy his personal tastes and to in turn produce such. The object was to provide a means or kit which would not only allow the individual to choose a particular shape for his ultimate clock but also the color coordination therefor, and hour designator and hour and minute hand designs and decorative extension if desired.

The vast flexibility of the invention is provided through the use of a highly versatile and novel clock housing which can be produced at relatively low cost. This feature accordingly permits the individual to produce and have a clock of a decorative nature at a correspondingly low cost.

The foregoing as well as other objectives of the invention are achieved by providing a clock kit comprising a clock housing, decorative means adopted to project from the housing, a clock motor support means, a motor housing, hour indicators, hour and minute hands and a felt covering, and optionally a soft pad having the shape of the clock.

SPECIFIC EMBODIMENTS

Attention is now directed to the Figures of the drawings wherein:

FIG. 5 is a fragmentary rear elevational view of the clock of FIG. 2 together with the sectional additions which are necessary to produce the clock having a round face;

FIGS. 6, 7 and 8 are lay-out pattern forms which may be used to construct a clock housing;

FIG. 9 is an enlarged fragmentary perspective view showing a modification of a corner assembly using pressure sensitive tape.

Figure 1:
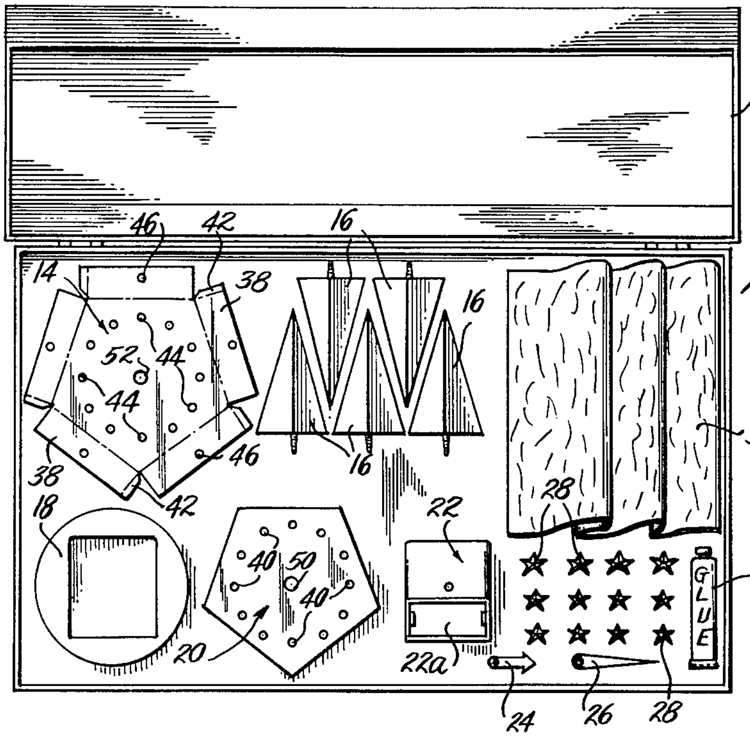
FIG. 1 is a plan view of an assembly kit, with the cover open, showing the various pieces for assembling a clock having a pentagonal design as in FIG. 2.

Referring now in greater detail to the various figures of the drawings wherein like numbers refer to like parts there is shown at 10 in FIG. 1 a clock kit embodying the present invention. The clock kit 10 comprising in a package 12, a clock housing blank 14, decorative objects 16, clock motor support 18, padding 20 which is shaped similarly to clock housing 14 (without tabs), clock motor 22 having battery space 22(*a*), hour hand indicator 24, minute hand indicator 26, hour members 28, glue 30 and felt 32.

Figure 2:
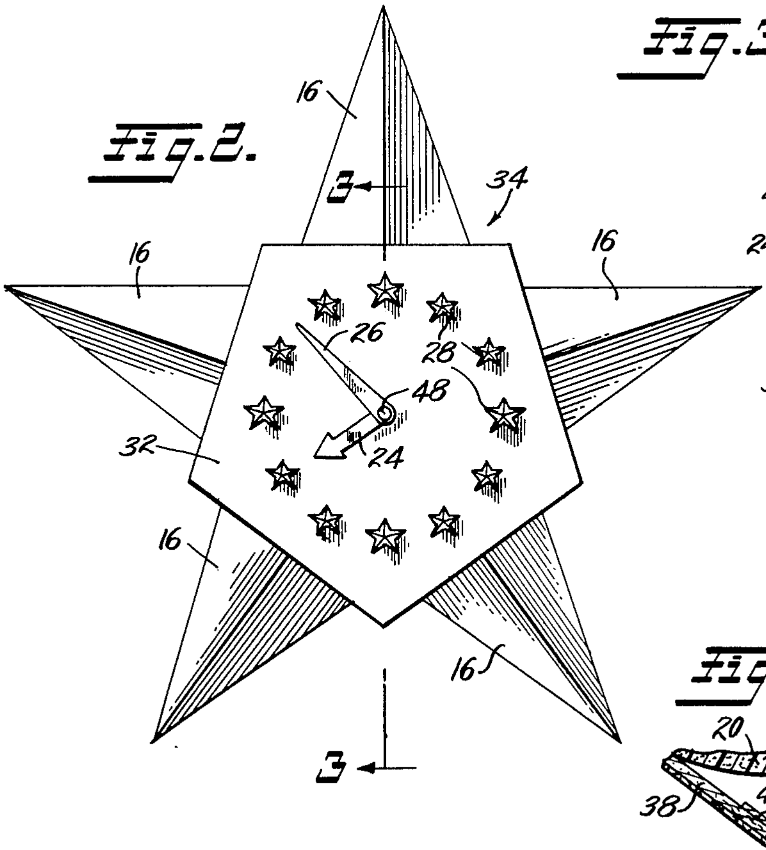
FIG. 2 is an enlarged elevational view of a completely assembled clock made in accordance with the invention and of pentagonal design.
Figure 3:
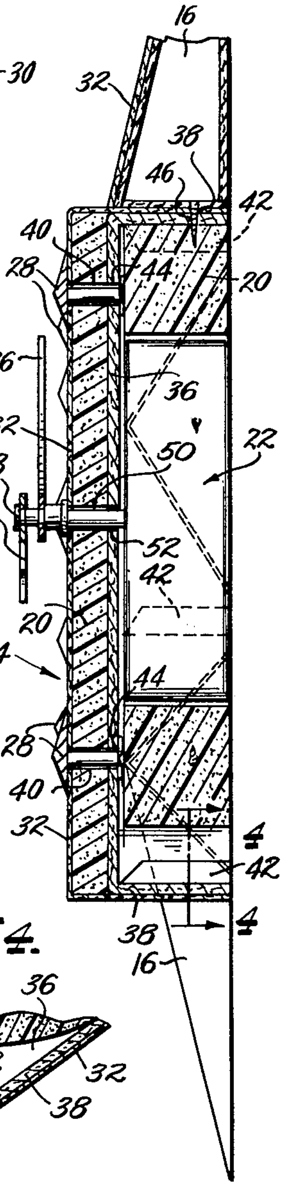
FIG. 3 is a fragmentary vertical sectional view, taken on the line 3—3 of FIG. 2.

As shown in FIG. 2, the completed clock has on its front face the felt 32, hour members 28, hour hand 24 and minute hand 24. Of course decorative members 16 are shown in the engaged or attached form.

Figure 4:
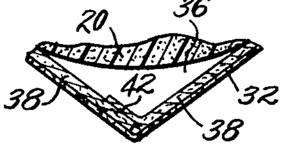
FIG. 4 is a fragmentary sectional view representing one manner of joining a corner of the clock housing, taken on the line 4—4 of FIG. 3.

Clock housing blank 14 forms an important part of the invention since it is it which provides the ease of assembly and the ability to provide the support structure of low cost. In FIG. 6 the clock housing blank 34 is depicted in hexagonal shape. Housing blank 34 comprises base 36 and tabs 38 which can be folded perpendicularly to base 36 on fold lines 140. Each tab may be folded such that in the preferred form extensions 42 (with an adhesive coating) will serve to hold the tabs permanently in an upstanding position as shown in FIG. 4 and FIG. 9. FIG. 4 depicts the arrangement when the individual tabs possess the appropriate extensions. FIG. 9 on the other hand shows the tabs connected where no extensions are provided on the tabs. In this case a pressure sensitive tape is used for the purpose.

Once the clock housing has been erected, the clock face is completed by applying padding 20 (e.g. foam rubber) to base 36 using a suitable adhesive. Felt covering 32 is fitted and adhered to the exterior side of the clock housing. Decorative members 16 which also may be fitted and covered with felt covering 32 are then connected to erected tabs 38, preferably utilizing an engaging means, such as bolts, which engage through openings 46 and firmly hold such in place. Hour means 28 are than attached through openings 40 in padding 20 and openings 44 in base 36 and made stationary by any suitable means.

Motor support 18 then is inserted and attached (adhesive is desired) within clock housing 14 as shown in FIG. 5. Motor 22 is then inserted in support 20 such that motor shaft 48 projects forwardly through opening 50 of padding 20, opening 52 of clock housing 14 and through felt 32. The minute 26 and hour 24 hands are then attached to motor shaft 48.

Because of the relatively straight forward design of the clock housing as illustrated by 14, 34, 54 and 64 of FIGS. 1, 6, 7 and 8 respectively, the clock housings can be produced by stamping or punching operations. In FIGS. 7 and 8, the tabs for the respective designs for the clock housing element depicted are numbered 138 and 238.

The base material may be any which is somewhat rigid since it must support various items such as the clock mechanism and various decorative appendages. Suitable materials range from cardboard, thin pressboard, semirigid plastic sheet material and if so desired, thin metal. With each material, provisions must be made so as to insure that the tabs can be folded so as to remain somewhat stationary until the appropriate securing means is used.

Before pointing out the final aspects of the invention it should perhaps be explained that although specific designs for items 16 and 28 have been illustrated, these items may of course be of any of many possible shapes or designs. For example item 16 may be wrought iron pieces having either straight or twisted shapes or a combination of both which may be of varying or the same length. On the other hand, the decorative appendages may be nothing more than small round ball attachments to provide perhaps a smaller decorative clock for areas where such might be more attractive or for areas which dictate the use of a smaller more compact arrangement.

Similarly hour indicators 28 may take on any reasonable form, e.g. round dots, numerals, etc. which may be connected by simply anchoring such in padding 20 or with the use of adhesives. Many decorative items of this nature are available which are attached to the head of a pointed small cylinderical structure. A fitted cap is the other engaged to the pointed end of the structure thereby stabilizing such after the pointed end is passed through the material.

Attention is now directed to FIG. 8 which illustrates a design which not only provides for a decorative clock but also provides various windows in which pictures, etc. may be introduced. The result then is a clock-picture composite.

Along these same lines it is of course possible to utilize the basic clock housing with modification to produce a simple but attractive frame. For example if the clock-face position were cut out of the housing as depicted by FIG. 8, and such were erected and decorated as with the clock housing, the result would be a very attractive frame for a picture. This aspect is considered to be part of the invention concept although not distinctly illustrated in the drawings.

As earlier disclosed the simplicity of stamping or punching the basic structure of the clock kit, i.e. clock housing 14 provides an economic attractiveness to the invention. However even with this simplistic method providing a clock housing such as illustrated by 14 which is round is not easily done. As can be appreciated the folding of the tabs always results in a somewhat angled, non-round shape. Therefore in order to produce a decorative clock having a round shape certain additional parts are necessary and these are depicted in the rear view presented in FIG. 5.

To produce a round shaped clock, one of the clock housings such as illustrated by 14 or 34 is utilized. After the clock housing is erected filler pieces 100 are attached to the sides of the housing as illustrated in FIG. 5. As apparent these circular pieces produce the round shape desired. Another modification is necessary if decorative pieces such as those depicted as 16 are to be utilized. In this case the star points at the widest end must be curved so as to fit properly against curved filler pieces 100. The filler pieces preferably should have openings located such as to permit entry and connection of the decorative pieces to and through openings 46 of tabs 38. After attachment of pieces 100, the clock housing is decorated and assembled as earlier described.

As apparent the above described modification can also be used to produce a round decorative frame for picture, etc. utilizing the technique described earlier.

Having thus described the invention, what I claim is:

1. A housing comprising a base, a plurality of circumferential tabs extending from the base, the tabs when taken together substantially extending about the circumference of the base, and said tabs being folded out of the plane of said base to be perpendicular thereto with the individual tabs being positioned against the next adjacent tab, wherein the respective tabs possess positional openings adapted to engage and hold decorative means and wherein said housing is a clock housing which further comprises openings circumferentially positioned in said base for receiving means to indicate the hours and a medially located opening.

2. A housing according to claim 1 wherein each of the tabs has an extension which is positioned against the adjacent tab and is adhesively held in such position.

* * * * *